United States Patent

Torrence et al.

Patent Number: 5,354,103
Date of Patent: Oct. 11, 1994

[54] QUICK CONNECT CONDUIT COUPLING

[75] Inventors: Robert J. Torrence, Addison; Kathryn D. Loew, Bensenville; Anthony M. Oliver, Northlake; Peter J. Malone, Mount Prospect, all of Ill.

[73] Assignee: Eaton Corporation, Cleveland, Ohio

[21] Appl. No.: 188,508

[22] Filed: Jan. 28, 1994

[51] Int. Cl.$^5$ .............................. F16L 39/00
[52] U.S. Cl. .................. 285/137.1; 285/321; 285/921
[58] Field of Search ............... 285/137.1, 321, 921, 285/319; 137/594, 595

[56] References Cited

U.S. PATENT DOCUMENTS

| | | | |
|---|---|---|---|
| 3,929,356 | 12/1975 | De Vincent et al. | 285/137.1 |
| 4,116,476 | 9/1978 | Porter et al. | 285/137.1 |
| 4,544,185 | 10/1985 | Weirich et al. | 285/137.1 |
| 4,753,268 | 6/1988 | Palav | 285/137.1 |
| 4,850,622 | 7/1989 | Suzuki | 285/921 |
| 4,900,065 | 2/1990 | Houck | 285/137.1 |
| 4,944,537 | 7/1990 | Usui et al. | 285/921 |
| 5,022,461 | 6/1991 | Potier et al. | 285/921 |
| 5,170,841 | 12/1992 | Briet | 285/921 |
| 5,271,646 | 12/1993 | Allread et al. | 285/137.1 |

FOREIGN PATENT DOCUMENTS

| | | | |
|---|---|---|---|
| 2615818 | 10/1977 | Fed. Rep. of Germany | 285/921 |
| 1220249 | 1/1971 | United Kingdom | 285/137.1 |

Primary Examiner—Eric K. Nicholson
Attorney, Agent, or Firm—Roger A. Johnston

[57] ABSTRACT

A technique for quick insert connecting tubular fluid pressure conduits into spaced ports having internal seal rings in a common side of a valve or block. A plastic spring lock member with apertures coinciding with the ports is disposed over the ports. The apertures are chamfered on a common side and slotted for permitting resilient expansion. The spring lock member is retained by a cover bolted to the block with clearance apertures over the ports. Upon insertion of a conduit with an annular convolution adjacent the end, the convolution cams against the chamfer expanding the slotted aperture permitting the convolution to snap through and the conduit to be retained in the port with the periphery of the conduit end contacting the internal seal ring.

7 Claims, 1 Drawing Sheet

1

QUICK CONNECT CONDUIT COUPLING

BACKGROUND OF THE INVENTION

The present invention relates to techniques for coupling tubular conduits to ports in a valve or block and particularly relates to connecting high pressure refrigerant tubes to expansion valves or connector blocks in the refrigerant circulation system. Quick connect couplings are employed to facilitate the assembly of automotive air conditioning systems in mass production as a means of reducing the amount of labor required to assemble the system components prior to charging with refrigerant. In such systems, the refrigerant is typically subjected to a relatively high pressure on the order of 350 psi (2400 kPa) upon discharge from the refrigerant compressor; and, thus the conduit fittings must seal such pressures and retain long term seal integrity over the service life of the automotive vehicle.

Heretofore, it has been the practice in assembling tubular conduits to ports in a valve or block to provide an annular seal in the port for sealing about the neck or end of the tube when inserted therein and to provide an annular convolution or bulge in the wall of the tube to provide a surface on the tube for mechanical retention on the block or valve. Typically, in such tubular connections, a retainer plate having an apertured or bifurcated end has the aperture or bifurcated portion disposed against the face of the bulge or convolution; and, the retainer is mechanically secured to the valve or block by suitable means such as metal deformation, localized staking, or threaded fasteners. Another technique employed for retaining the tube is to orbitally stake the material of the block or valve about the port over the convolution of the tube. Either of the aforesaid techniques for attaching a tubular conduit to a valve or block requires complicated attachment or fabrication operations at assembly and therefor have proven prohibitively costly for tubular conduit connections in mass production assembly of automotive air conditioning systems. Thus it has been desired to provide a way or means of quick connecting tubular conduits onto a junction block or valve for use with relatively high pressures in a manner which provides reliable low cost assembly in mass production and which requires no tools or installation of fasteners at the time the connection is made at assembly.

SUMMARY OF THE INVENTION

The present invention provides a quick connect assembly for coupling tubular conduit to a valve or block for releasable connection thereto and has particular application to relatively high pressure refrigerant conduit couplings. The coupling is of the type employing conduits having an annular convolution or bulge formed adjacent the end thereof for providing a mechanical retention surface to retain the coupling engagement upon assembly. The present invention employs a spring lock member formed of resiliently deformable preferably plastic material having apertures therein spaced and configured to coincide with ports in a valve or block to which the conduits are to be attached. The spring lock member is retained on the valve or block by a retaining plate which has clearance holes therein coinciding with the apertures in the spring lock member and which is releasably attached to the valve or block by a suitable fastening means such as a threaded fastener. The spring lock member has the apertures therein provided with camming surfaces thereabout and portions thereof relieved by a slot to permit resilient expansion of the aperture. The conduits are each inserted into one of the spring lock member apertures with the convolution bearing against the camming surfaces and forced against the camming surfaces to cause expansion of the aperture and passage of the convolution therethrough resulting in the spring lock member constricting about the tube after passage of the convolution therethrough to retain the conduit therein.

DETAILED DESCRIPTION

Figure 2:
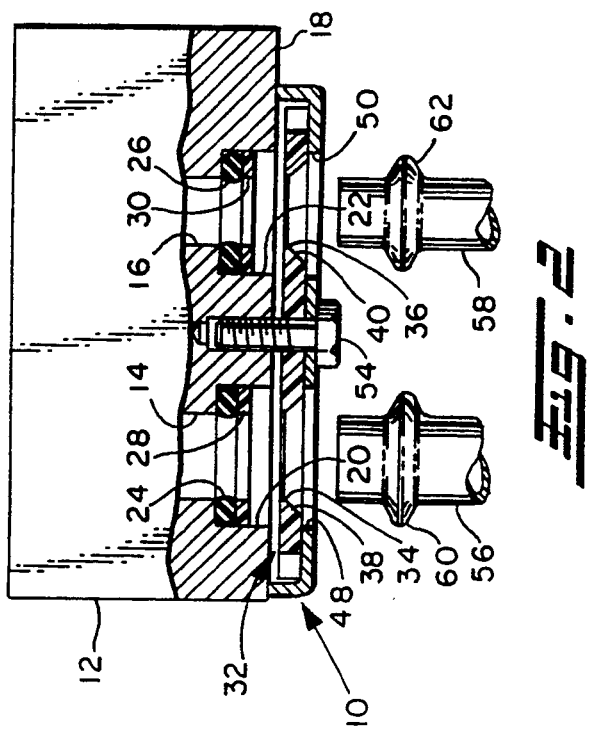
FIG. 2 is a view of a block or valve with the spring lock member and plate assembled thereon prior to the tube connection.
Figure 1:
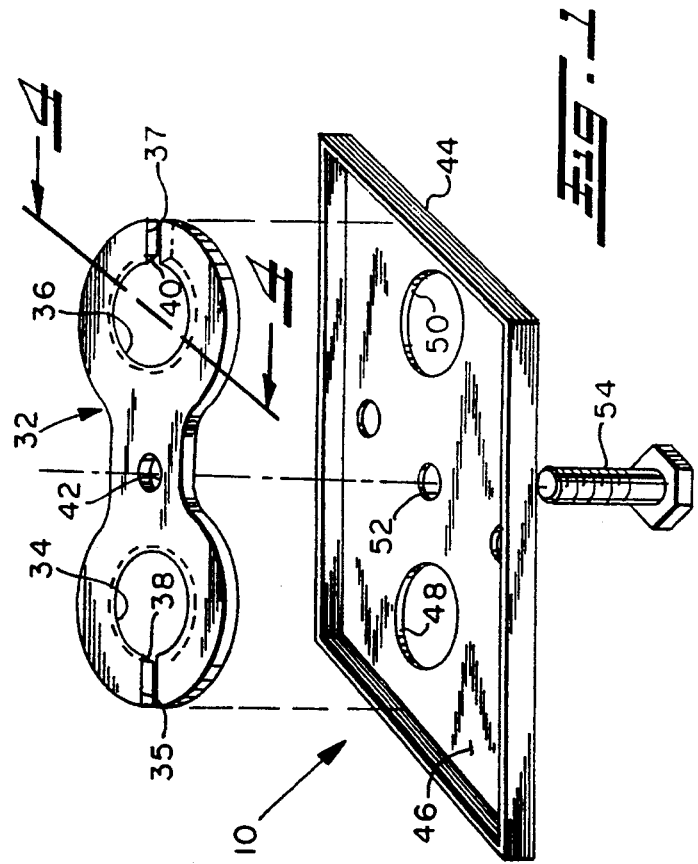
FIG. 1 is an exploded view of the hover and spring lock member of the present invention.
Figure 4:
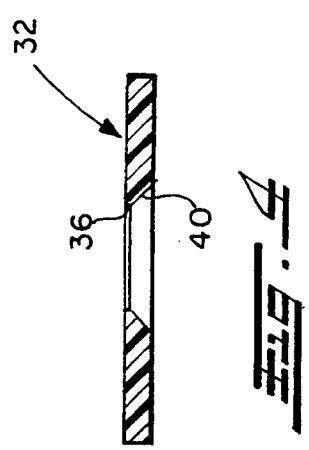

Referring to FIGS. 1, 2 and 4, the assembly of the present invention is indicated generally at 10 and includes the valve or block 12 which may be a coupling block or expansion valve of the type employed in automotive air conditioning systems, which has a plurality of spaced fluid ports 14, 16 formed therein on a common face or side 18 of the block 12. The ports 14, 16 preferably each have a counterbore 20,22 formed therein which has received therein an annular seal such as an o-ring as denoted by reference numerals 24,26. Preferably each of the seal rings 24,26 has a suitable backup ring of substantially more rigid material provided thereover as denoted by reference numerals 28,30 as is well known in the art.

The common side 18 of the block 12 has received thereover a spring lock member indicated generally at 32 which is formed of resilient material, as for example, plastic material and which has spaced apertures 34, 36 formed therein which are spaced to coincide with ports 14, 16; and, each of the apertures 34,36 has camming surfaces provided thereabout on a common side thereof. In the presently preferred practice, the invention the camming surfaces comprise chamfers 38,40 formed on a common side Of the member 32. One of the chamfers is shown in detail in FIG. 4 and indicated by reference numeral 40 for the aperture 36. It will be understood that the chamfer 38 in aperture 34 is similar in configuration to chamfer 40. Member 32 has a central aperture or hole 42 formed therethrough for receiving a suitable fastener therethrough.

A spring lock member 32 is retained on the block 12 by a cover plate 44 which is provided with a recessed portion therein denoted by reference numeral 46 and which has a depth slightly greater than the thickness of the spring lock member 32. Cover 44 has clearance apertures 48,50 formed therein which are spaced to coincide with apertures 34,36 in the spring lock member and which are sufficiently large to permit the convoluted portion hereinafter described of the tubular conduits to be connected to pass through the apertures 48,50. The cover 44 has an aperture 52 provided therein through which is received a suitable fastener, such as screw 54 which is threadedly engaged in the block to retain the spring lock member in place over the ports 14, 16 with the chamfered camming surfaces 38,40 facing the clearance apertures 48,50 in the cover. The assembly of the spring lock member and cover onto the block 12 is shown in FIG. 2 with the conduits to be connected denoted by reference numerals 56,58 and as having annular convolutions 60,62.

Figure 3:
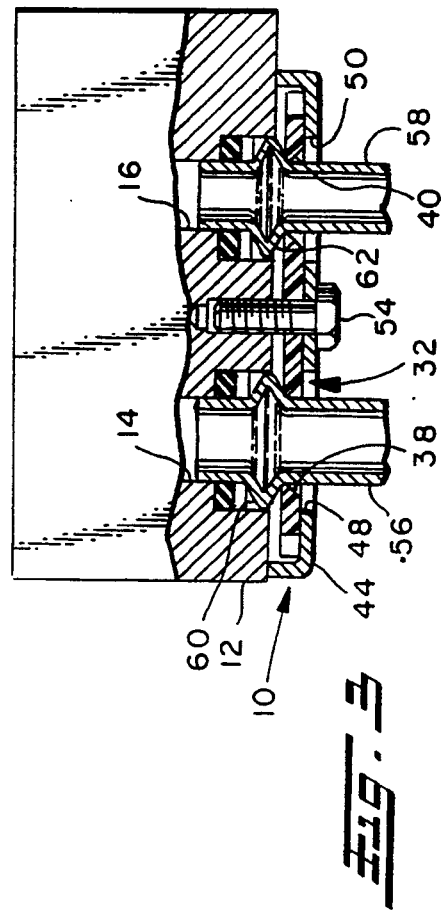
FIG. 3 is a view similar to FIG. 2 with the tubular conduits in the connected condition; and, FIG. 4 is a section view taken along section indicating lines 4—4 of FIG. 1.

Referring to FIG. 3, the conduit 56 is shown as inserted through aperture 34 with the annular convolution 60 having contacted camming surface 38 and expanded aperture 34 by resiliently deforming the member 32 such that the slot 35 is widened and the annular convolution 60 has passed therethrough permitting the aperture 34 to return to its original configuration with slot 35 narrowed to its original width and the aperture 34 bearing against the face of annular convolution 60 for retaining the conduit 56 in the port 14 and sealed about the inner periphery of seal ring 24. In like manner, conduit 58 is inserted in aperture 36 with annular convolution 62 bearing against camming surface 40 so as to expand the slot 37 and aperture 36 until the convolution 62 has passed therethrough and the slot 37 has returned to its original width retaining the conduit 58 in the port 16 and sealed about the inner periphery of seal ring 26.

The present invention thus provides a technique for pre-assembling a spring lock member to a valve or block having fluid ports on a common face thereof to which it is desired to connect tubular conduits thereto by quick bayonet type connection. A spring lock member of the present invention is preassembled and retained on the valve or block by a cover member releasably fastened thereto. At installation, it is only necessary to insert the conduit into the spring lock member and cam the convolution on the conduit against the camming surface of the spring lock member to expand the aperture and permit the convolution and conduit to snap therethrough for securely retaining the conduit in the block and sealed against a seal ring provided therein.

Although the present invention has been described hereinabove with respect to the illustrated embodiments, it will be understood that the invention is capable of modification and variation and is limited only by the scope of the following claims.

We claim:

1. A quick connect assembly for plural tubular conduits comprising:
    (a) a block or valve having a plurality of fluid ports on a common side thereof with an annular seal disposed about the inner periphery of each port;
    (b) a spring lock member having a plurality of apertures therethrough corresponding to the plurality of fluid ports, each of said apertures including camming surfaces thereabout on a common side thereof and having portions of the periphery thereof relieved to permit resilient enlargement thereof, said spring lock member disposed against said common side of said block or valve with said apertures each aligned with one of said ports;
    (c) retaining plate means received over said spring lock member and releasably fastened to said block or valve, said plate means having a plurality of clearance cut-outs formed therein, with one of said cut-outs aligned with each of said fluid ports, said plate means securing said spring lock member in place on said block or valve; and,
    (d) a plurality of tubular conduits each having an annular convoluting or bulge thereon spaced from one end thereof wherein said end of each of said conduits is inserted in said aperture with said convolution contact said camming surface and enlarging said aperture until said convolution passes through said aperture with said seal sealing about the periphery of said conduit and said spring lock member camming surfaces return to their original position preventing withdrawal of said conduit.

2. The assembly defined in claim 1, wherein said relieved portions of said spring lock member comprises a slot cut in said member extending radially outwardly from each of said apertures.

3. The assembly defined in claim 1, wherein said plate means secured by a threaded fastener received through said spring lock member.

4. The assembly defined in claim 1, wherein said spring lock member is formed of plastic material.

5. A method of quick-insert connecting tubular fluid conduits to a valve or block comprising:
    (a) providing a valve or block with plural ports and common side thereof disposing an annular seal in each port;
    (b) disposing a resilient spring lock member on said valve or block and providing apertures therein with camming surfaces thereon over each of the ports;
    (c) providing a retainer and releasably fastening same to said block over said spring lock member;
    (d) providing a plurality of tubular conduits and forming an annular convolution adjacent one end of each conduit and inserting said one end in one said apertures and moving said convolution against said camming surfaces and expanding said apertures of said spring lock member and passing said convolution through said aperture in spring lock engagement and inserting said one end into said annular seal.

6. The method defined in claim 5, wherein said step of disposing a seal includes forming a counterbore in each port and inserting an o-ring and a backup ring thereon.

7. The method defined in claim 5, wherein said step of releasably fastening said retainer includes forming an aperture in said retainer and said spring lock member and inverting a fastener therethrough and threadedly engaging the fastener in said block or valve.

* * * * *